(12) United States Patent
Goldberg et al.

(10) Patent No.: US 8,825,599 B2
(45) Date of Patent: Sep. 2, 2014

(54) COMPUTER-BASED DATA PROCESSING SYSTEM AND METHOD OF PROCESSING DATA OBJECTS

(75) Inventors: Motti M Goldberg, Kilchberg (CH); Boris Wedl, Zurich (CH)

(73) Assignee: Swiss Reinsurance Company Ltd., Zürich (CH)

( * ) Notice: Subject to any disclaimer, the term of this patent is extended or adjusted under 35 U.S.C. 154(b) by 901 days.

(21) Appl. No.: 12/063,065

(22) PCT Filed: Aug. 16, 2005

(86) PCT No.: PCT/CH2005/000474
§ 371 (c)(1),
(2), (4) Date: Feb. 6, 2008

(87) PCT Pub. No.: WO2007/019711
PCT Pub. Date: Feb. 22, 2007

(65) Prior Publication Data
US 2010/0161558 A1    Jun. 24, 2010

(51) Int. Cl.
*G06F 7/00* (2006.01)
*G06F 17/00* (2006.01)

(52) U.S. Cl.
USPC ............................ 707/639; 707/634; 707/638

(58) Field of Classification Search
None
See application file for complete search history.

(56) References Cited

U.S. PATENT DOCUMENTS

| | | | | |
|---|---|---|---|---|
| 4,853,843 A | * | 8/1989 | Ecklund | 707/E17.032 |
| 7,398,422 B2 | * | 7/2008 | Amano et al. | 707/999.202 |
| 7,603,357 B1 | * | 10/2009 | Gourdol et al. | 707/999.001 |
| 2003/0105768 A1 | | 6/2003 | Berkowitz et al. | |
| 2003/0233372 A1 | * | 12/2003 | Warner et al. | 707/104.1 |
| 2004/0003353 A1 | * | 1/2004 | Rivera et al. | 715/530 |
| 2004/0059813 A1 | * | 3/2004 | Bolder et al. | 709/224 |
| 2004/0078373 A1 | | 4/2004 | Ghoneimy et al. | |
| 2004/0122835 A1 | | 6/2004 | McKibben et al. | |
| 2006/0095429 A1 | * | 5/2006 | Abhyankar et al. | 707/7 |
| 2007/0220065 A1 | * | 9/2007 | Coyle et al. | 707/203 |

OTHER PUBLICATIONS

Dalaney, Kalen "Database Concurrency and Row Level Versioning in SQL Server 2005", Microsoft SQL Server Tech Center (2005).

* cited by examiner

*Primary Examiner* — Fred I Ehichioya
*Assistant Examiner* — Jau-Shya Meng
(74) *Attorney, Agent, or Firm* — Oblon, Spivak, McClelland, Maier & Neustadt, L.L.P.

(57) ABSTRACT

A computer-based system creates a data object by preparing a data structure for the data object in a database and processes the data object at different processing stages each associating a different workflow state with the data object. The system can take and store automatically a snapshot of the data object, prior to a workflow transition of the data object from a first workflow state to a second workflow state, respectively associated with the snapshot and with the data object. The system also creates a unique locating reference for the snapshot based on a unique locating reference created previously for the data object. When the unique locating reference for the data object is received, controlled access to the data object and the snapshot is provided. Based on one unique locating reference, multiple states of the data object can be easily and efficiently made available concurrently to a user.

17 Claims, 5 Drawing Sheets

COMPUTER-BASED DATA PROCESSING SYSTEM AND METHOD OF PROCESSING DATA OBJECTS

TECHNICAL FIELD

The present invention relates to a computer-based system for processing data objects and a computer-based method of processing data objects. Specifically, the present invention relates to a computer-based system and a computer-based method configured to create a data object by preparing a data structure for the data object in a database and to process the data object at different processing stages, associating a different workflow state with the data object at each processing stage.

BACKGROUND ART

Computer-based workflow control systems are used in a variety of scenarios where work items are processed at different processing stages. Generally, for representing the work item, for example a concrete, physical object such as a piece of equipment or a document, or an abstract object such as an electronic representation of a document, a data object is created and stored as a data structure in a database. For processing the work item, the workflow control system controls the transitions of the work item and/or the respective data object between the different processing stages, associating a different workflow state with the data object at each processing stage. Typically, the workflow control system controls what actions are permitted and/or must be performed at each processing stage. Particularly, if the work item is the data object, the workflow control system controls what actions on the data object are permitted and/or must be performed by an application process. Application processes performing actions on the data object may be fully automated or controlled by a user. The actions on an object that a user is permitted to perform through an application process are determined by specific roles or profiles associated with the user. Each workflow state has a user role assigned. During processing of a data object, the workflow control system creates a workflow instance for the data object wherein a specific user (reference) is assigned to each possible workflow state of the workflow instance. If the role or profile of a previous user changes, the workflow control system must assign a new user to pending workflow states to which the previous user was assigned. The workflow control system notifies a user assigned to the current workflow state of a data object. Systems that are based on such conventional workflow control systems show limitations in team-based (collaborative) data processing and in data processing systems where unique locating references are used to reference the data objects, for example a URL (Uniform Resource Locator) for direct access to the data object by a conventional browser. Particularly, in the conventional systems, references to data objects are used in such a way that a specific action on a data object is linked tightly to the time of the request of the action but not to the time the action is actually performed. Thus, in the conventional systems, a reference to a data object always relates to a particular instance of the data object, i.e. to the data object at a specific state, and the state of the data object cannot be changed while a user's action is awaited. However, in team-based processing it must be possible for one user to change the state of a data object while another user is awaited to perform a required action on the data object. The conventional systems are limited to processing scenarios where the information included in a data object and references to the data object remain valid (unchanged) from the time the data object is assigned to a workflow state to the time actions are performed in the data object. Otherwise, if the data object changed between the time the user was notified and the time he/she actually performed the required action, the action may be inappropriate and/or performed on the wrong instance of data object.

DISCLOSURE OF INVENTION

It is an object of this invention to provide a computer-based system for processing data objects and a computer-based method of processing data objects, which system and method do not have some of the disadvantages of the prior art. In particular, it is an object of the present invention to provide a computer-based system and a computer-based method for processing data objects at different processing stages, which system and method are suitable for collaborative processing of the data objects, making possible concurrent processing of the data objects by multiple users. It is a further object of the present invention to provide a computer-based system and a computer-based method for processing data objects at different processing stages, which system and method make it possible to reference the data objects by means of unique locating references. Thus it is an object of this invention to provide data structures and functional modules configured such that a computer-based system for processing data objects and a computer-based method of processing data objects are enabled to process data objects at different processing stages, while data objects can be processed concurrently by multiple users and while data objects can be referenced by means of unique locating references.

According to the present invention, these objects are achieved particularly through the features of the independent claims. In addition, further advantageous embodiments follow from the dependent claims and the description.

According to the present invention, the above-mentioned objects are particularly achieved in that, a data object is created by a computer preparing a data structure for the data object in a database, in that the data object is processed at different processing stages, the computer associating automatically a different workflow state with the data object at each processing stage, in that a unique locating reference is created for the data object, in that a snapshot of at least a part of the data object, is taken and stored by the computer prior to a workflow transition of the data object from a first workflow state to a second workflow state, in that the first workflow state is associated by the computer with the snapshot, in that the second workflow state is associated by the computer with the data object, in that a unique locating reference is created by the computer for the snapshot based on the unique locating reference for the data object, in that the unique locating reference for the data object is received by the computer from an application process, and in that controlled access to the data object and to the snapshot is provided by the computer to the application process in return to the unique locating reference for the data object. For example, the workflow transition of the data object is enabled based on workflow rules applicable to values of data elements of the data object's data structure. Storing automatically snapshot of data objects prior to workflow transitions and assigning the workflow states, from times prior and after the transition, to the snapshot or data object, respectively, have the advantage that multiple states of the data object, at different workflow states, can be made available concurrently to a user. Furthermore, providing access to the data object and to the snapshot based on one unique locating reference for the data object makes it possible for a user to access easily and efficiently multiple states of the data object with one common reference. Consequently, a user is able to access the full history of a data object by means of one common reference. Keeping multiple states of a data object also supports collaborative processing where multiple users concurrently or at different times access different states of the data object.

In a preferred embodiment, prior to the workflow transition of the data object from the first workflow state to the second workflow state, a replica of the data object is created by the computer and a third workflow state is associated with the replica. Based on the unique locating reference for the data object, the computer creates unique locating reference for the replica. Controlled access to the data object, the snapshot, and the replica is provided by the computer to the application process based on the unique locating reference for the data object. Creating a replica (i.e. a full copy) of the data object and assigning a new workflow state to the replica makes it possible for multiple users to use concurrently or at different times different instances (or copies) of data objects for further processing. Thus, workflow paths for processing data objects can be forked at an earlier processing stage and possibly rejoined at a later processing stage. Guiding multiple instances of a data object along different workflow paths also makes possible collaborative processing where multiple users concurrently or at different times access and process different instances (copies) of the data object.

In an embodiment, the computer determines an object state of the data object based on individual values of data elements of the data object's data structure. When the object state corresponds to one of a set of defined special object states, the computer creates and stores a snapshot of at least a part of the data object and associates the object state with the snapshot. Creating and storing a snapshot of the data object based on an object state that depends on data elements of the data object have the advantage that different defined states of a data object are captured automatically and can be made available to users based on the unique locating reference for the data object. In a further embodiment, the computer enables actions applicable to the data object depending on the object state and depending on a user profile associated with a user of the application process.

In a further embodiment, the computer presents to a user of the application process on a display a different view of the data object depending on the workflow state associated with the data object and depending on a user profile associated with the user.

In another preferred embodiment, the computer provides to a user of the application process access to the data object, to one or more replicas, created of the data object in connection with workflow transitions of the data object, and to one or more snapshots, taken of the data object and the replicas in connection with workflow transitions of the data object and the replicas. Access is provided in return to the unique locating reference for the data object and based on a user profile associated with the user and on object states and workflow states associated with the data object, the snapshots, and the replicas. Moreover the computer enables actions applicable to the data object, the replicas, and the snapshots, based on the user profile, the object states, and the workflow states. Providing access to and enabling actions on a data object and its replicas and snapshots, based on the user profile, the object states, and the workflow states make possible collaborative and controlled processing of data objects along multiple workflow paths. Furthermore, the processing and workflow history of a data object, i.e. its states and instances, can be accessed easily, efficiently, and consistently by means of one common unique locating reference for the data object.

In a further embodiment, the computer determines from the data object, the snapshots, and the replicas a most significant data object and presents to the user on a display a view of the most significant data object. Furthermore, the computer makes available to the user interface means for accessing from the data object, the snapshots, and the replicas remaining data objects, not determined to be the most significant data object. Presenting automatically to the user a most significant data object while making available to the user interface means for accessing the remaining other data objects makes it possible for a user to access all aspects, i.e. states and instances, of a data object in an organized, structured, and consistent way. It is possible to select and present to the user a most significant aspect of the data object in a user-specific and workflow-dependent way. Further, less significant aspects of the data object can be accessed selectively by the user through structured interface means such as graphical representations of electronic folders.

In yet another embodiment, the computer receives with the unique locating reference for the data object a modifier and provides to a user of the application process access to the data object, to the one or more replicas of the data object, and to one or more snapshots of the data object and the replicas, in return to the unique locating reference for the data object and based on the modifier. Furthermore, the computer enables actions applicable to the data object, the replicas, and the snapshots, based on the modifier. Providing access to and enabling actions on a data object and its replicas and snapshots, based on a modifier applied to the unique locating reference make it possible for a user or an application process to specify easily, flexibly, and consistently different views and modes for accessing or processing the data object, respectively. For example, the modifier includes a value of a data element of the data object's data structure.

In addition to the computer-based system for processing data objects and the computer-based method of processing the data objects, the present invention also relates to a computer program product including computer program code means for controlling one or more processors of a computer, particularly, a computer program product including a computer readable medium containing therein the computer program code means. The computer program code means are configured to control the processors of the computer such that the computer processes the data objects according to the above-described method of processing data objects.

BRIEF DESCRIPTION OF THE DRAWINGS

The present invention will be explained in more detail, by way of example, with reference to the drawings in which.

MODE(S) FOR CARRYING OUT THE INVENTION

Figure 1:
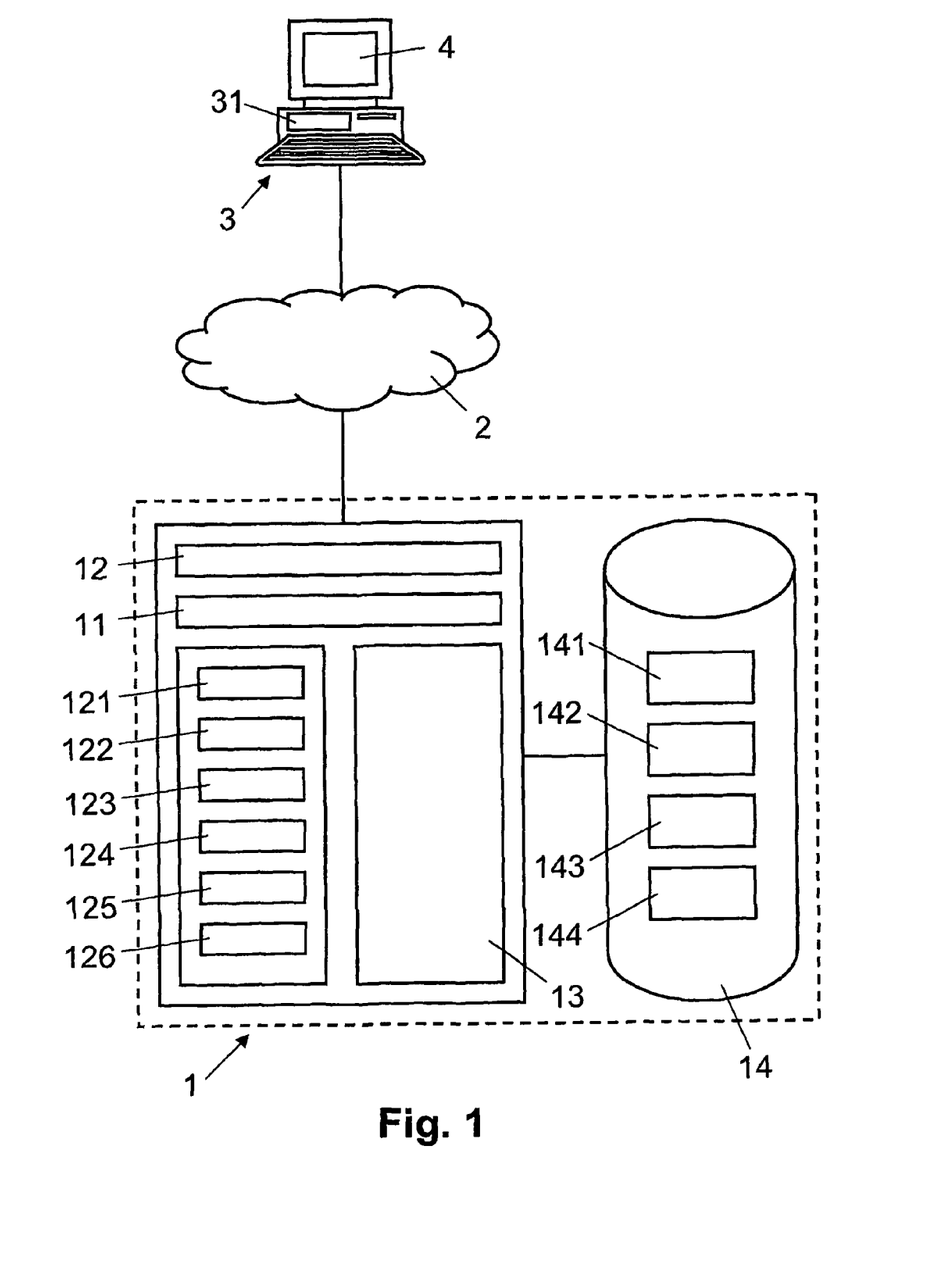
FIG. 1 shows a block diagram illustrating schematically an exemplary configuration of a computer-based data processing system for practicing embodiments of the present invention, said configuration comprising a computer with a processor and memory, and said configuration being connected to a user workstation via a telecommunications network.

In FIG. 1, reference numeral 1 refers to a computer-based data processing system. The data processing system 1 includes one or more computers, for example networked server computers, comprising one or more processors. As is illustrated schematically, the data processing system 1 is connected to at least one user workstation 3 via a telecommunications network 2. The workstation 3 includes a personal computer, a laptop computer, or a mobile radio telephone or personal digital assistant, respectively, as well as a display 4. The reference numeral 12 refers to a communication module, configured for data communication with the workstation 3 via the telecommunications network 2. The telecommunications network 2 includes a fixed network and/or a wireless network. For example, the telecommunications network 2 includes a local area network (LAN), an integrated services digital network (ISDN), the Internet, a global system for mobile communication (GSM), a universal mobile telephone system (UMTS) or another mobile radio telephone system, and/or a wireless local area network (WLAN).

As is illustrated in FIG. 1, the workstation 3 includes an application process 31 controllable by a user of the workstation 3. The application process 31 is a programmed software module configured to interact with the data processing system 1. Depending on the embodiment, the application process 31 interacts with the data processing system 1 through application process 11 or directly through data object management module 12, workflow control module 13, and/or database 14. Application process 31 includes, for example, a conventional Internet browser.

The data object management module 12 and the workflow control module 13 are programmed software modules. The data object management module 12, the workflow control module 13, and the database 14 are implemented on the same or on different computers of the data processing system 1. The database 14 includes data structures for storing workflow rules 141, workflow instances 142, data object instances 143, and user profiles 144.

In Table 1, an example of the data structure of a workflow instance is illustrated. As is illustrated in Table 1, a workflow instance includes its unique reference as well as a unique locating reference of a data object instance associated with the workflow instance. Moreover, the workflow instance includes a current workflow state and a history of the workflow instance, indicating what workflow transitions were executed and at what time (date and time of day).

TABLE 1

Figure 2:
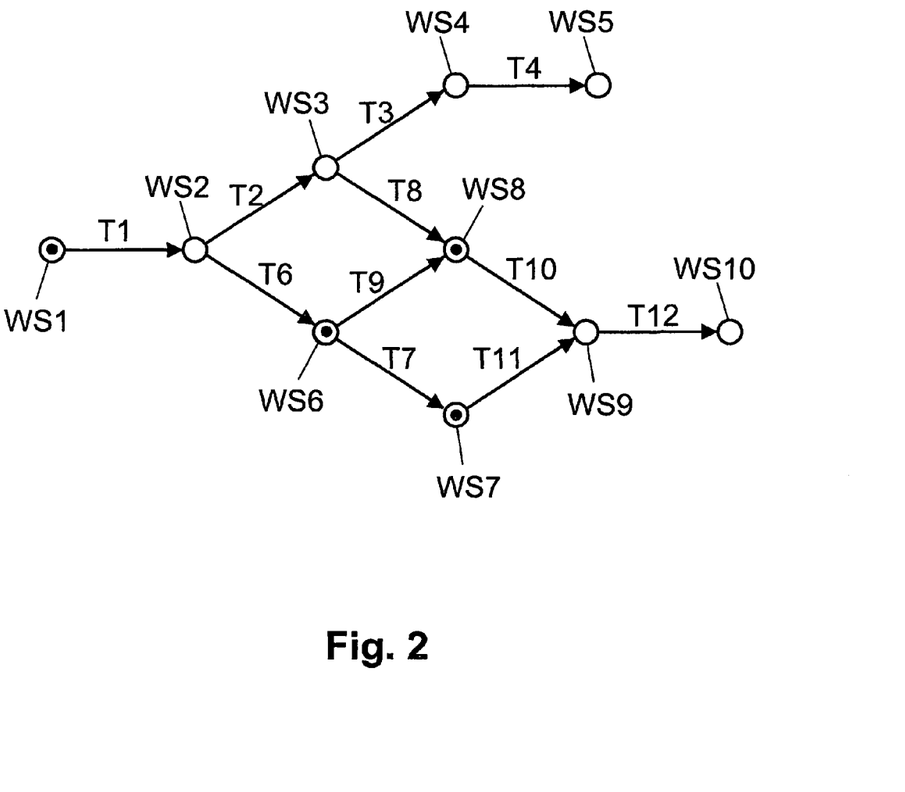
FIG. 2 shows a state transition diagram illustrating an example of a workflow, wherein workflow transitions lead from initial workflow states to subsequent workflow states.

Unique Reference
Unique Locating Reference of Associated Data Object Instance
Workflow State
Workflow Instance History As is illustrated in the state transition diagram of FIG. 2, a transition T1, T2, T3, T4, T5, T6, T7, T8, T9, T10, T11 leads from one initial workflow state WS1, WS2, WS3, WS4, WS6, WS7, WS8, WS9 to another subsequent workflow state WS2, WS3, WS4, WS5, WS6, WS7, WS8, WS9, WS10. A workflow instance 142 is associated with a data object instance 143 and defines the current workflow state and the workflow transition history of the respective data object instance 143. The workflow rules 141 define for a workflow scenario actions to be taken on a data object at processing stages corresponding to workflow states. Moreover, the workflow rules 141 define how the outcome of an action is to be checked, and what state transition is associated with a particular outcome of an action. Furthermore, for determining actions to be taken and state transitions to be executed, some of the workflow rules are also applicable to values of data elements of a data object's data structure.

Table 2 illustrates an example of the data structure of a data object (instance). A data object instance includes its unique locating reference as well as a unique reference of a workflow instance associated with the data object instance. The unique locating reference may be structured hierarchically, for example in the form of a URL (Uniform Resource Locator, e.g. "http://abc.xyz.com/contracts/123"). Moreover, a data object instance includes object attributes, such as an object state, qualitative and/or quantitative status attributes (e.g. the data object has been validated or 70% of the data object's data elements have been collected), a time when the data object was saved, a version number, actions (e.g. view, modify, i.e. data editing or data entry) permitted on the data object, and a media type for viewing the object content, for example HTML (Hypertext Markup Language) or XML (Extended Hypertext Markup Language). In addition to defined data elements, the object content of the data object may also include references to linked objects such as word processing documents or scanned images.

TABLE 2

| Unique Locating Reference | |
| Unique Reference of Associated Workflow Instance | |
| --- | --- |
| Object Attributes | Object State |
|  | Status Attributes |
|  | Time |
|  | Version |
|  | Action(s) |
|  | Media |
| Object Content | Data Elements |
|  | Embedded Objects |
| Object Rules | Validation Rules |
|  | Processing Rules |
| Object Instances | Pointers to Snapshots |
|  | Pointers to Replicas |

The data object also includes object rules, such as validation rules, used for validating the values of the object content's data elements, or processing rules. The processing rules are used for determining the object state from the values of the object content's data elements or for determining at what states of the data object to take a snapshot of the data object. The validation rules include rules for individual data elements of the data object as well as intra-object rules for validating the relationship of one or more data elements. The object rules can also be stored as a rules identifier or an object class or type identifier, determining object rules of the respective class or type of data objects. Furthermore, the data object includes pointers to related data objects instances, particularly pointers to snapshots and replicas of the data object.

A snapshot of a data object is a new data object instance including at least a part of the original data object, particularly the object state and possibly other object attributes. Each snapshot includes a unique locating reference based on the unique locating reference of the original data object. The snapshot is taken prior to a workflow transition of the original data object from a first workflow state to a second workflow state. In an embodiment, the snapshot also includes the current (first) workflow state as an attribute. The attributes most frequently included in a snapshot, e.g. object state, time saved, the value of object status attributes, etc., are typically used in a search screen of the application process 31 as search criteria or as a modifier for retrieving a data object. As the name suggests, a snapshot represents the values of at least some of a data object's data elements at a specific point in time in the (workflow) history of the data object.

A replica of a data object is a new data object instance including a copy of the original data object. Each replica includes a unique locating reference based on the unique locating reference of the original data object. The replica is created prior to a workflow transition of the original data object from a first workflow state to a second workflow state. However, the replica is associated with its own third workflow state. Unlike a snapshot, a replica of a data object has a "life of its own", i.e. the respective data object instance cannot only be viewed but also processed and modified by a user or application process 11, 31.

The user profiles 144 define for users, determined by user identifying information, access rights to data objects, specifically, what (types or classes of) data objects a user is allowed to access and what actions the user is permitted to perform on the data objects. The user profiles 144 also include user roles defining their responsibilities for processing data objects at defined processing stages corresponding to workflow states.

The workflow control module 13 includes a workflow engine configured to create and manage workflow instances associated with data objects based on the workflow rules 141. Thus the workflow control module 13 controls the workflow of data objects. Furthermore, based on the user profiles 144, the workflow control module 13 assigns data objects for processing at specific processing stages, corresponding to workflow states, users and/or user groups. In an alternative embodiment, the workflow rules are incorporated in the workflow control module 13 rather than stored in the database 14.

The data object management module 12 includes various functions for handling data objects: a create/register function 121, a snapshot function 122, a replicate function 123, a merging function 124, a state setting function 125, and a mapping function 126. Although these functions are described to be associated and implemented with the data object management module 12, one skilled in the art will understand that, in alternative embodiments, these functions can also be part of workflow control module 13 or application processes 31 or 11.

The create/register function 121 is configured to create and register a data object instance in the database 14. Typically, the create/register function 121 is called by application process 11 or 31. However, depending on the implementation, the create/register function 121 can also be called by the workflow control module 13. To create a data object instance, the create/register function 121 receives information about type or class of the data object as well as application and/or user specific initial values for object content and/or object rules. Typically, however, the create/register function 121 sets initial values for the object attributes and object rules depending on type and/or class of the data object. The create/register function 121 defines a unique locating reference for the data object depending on type and/or class of the data object, as well as requesting application process. Furthermore, the create/register function 121 requests from the workflow control module 13 creation of a workflow instance to be associated with the respective data object instance. The unique reference of the associated workflow instance is stored with the data object instance.

The snapshot function 122 is configured to take a snapshot of a specified data object and to store the snapshot in the database 14. Typically, the snapshot function 122 is called by the workflow control module 13 prior to performing a workflow state transition of the workflow instance associated with the data object. However, depending on the implementation, the snapshot function 122 can also be called by application process 11 or 31, or by a stored procedure in the database 14, triggered by a change in object state and/or workflow state associated with the data object. In a preferred embodiment, execution of the snapshot function 122 depends on respective processing rules associated with the data object instance, for example, a snapshot may only be taken at certain states of the data object, i.e. if the object state corresponds to one of a set of defined special object states. The snapshot function 122 creates a unique locating reference for the snapshot based on the unique locating reference of the data object of which the snapshot is taken. Preferably, adding a unique identifier to the unique locating reference of the data object of which the snapshot is taken forms the unique locating reference for the snapshot. The syntax of the unique identifier reflects its semantic association with its originator. For example, appending version or state information to the unique locating reference of the data object creates the unique locating reference of the snapshot. The snapshot is linked to the data object instance undergoing the workflow transition (i.e. the original data object instance) by inserting into the data object a pointer to the snapshot. The snapshot can be provided with a reverse pointer to the original data object instance.

The replicate function 123 is configured to replicate a specified data object by creating a new data object instance including a copy of the original data object. The replica is stored in the database 14. Typically, the replicate function 122 is called by the workflow control module 13 prior to performing a fork in the workflow scenario, where two or more transitions are leading from one workflow state to two or more different workflow states. Moreover, to assign a different workflow state to the replica, the replicate function 122 requests from the workflow control module 13 creation of a new workflow instance to be associated with the replica. Depending on the implementation, the replicate function 122 can also be called by application process 11 or 31, or by a stored procedure in the database 14, triggered by a change in the workflow state associated with the data object. The replicate function 123 creates a unique locating reference for the replica based on the unique locating reference of the data object of which the replica was created from. Preferably, the unique locating reference for the replica is formed, as described above for the snapshot, by adding a unique identifier to the unique locating reference of the data object of which the replica was created from. For example, the unique locating reference of the replica is created by appending version or workflow state information to the unique locating reference of the data object. The replica is linked to the data object instance undergoing the workflow transition (i.e. the original data object instance) by inserting into the data object a pointer to the replica. The replica can be provided with a reverse pointer to the original data object instance.

The merging function 124 is configured to merge two (or more) data object instances into one data object instance. The merging of data object instances is performed according to defined merging rules. For example, the merging rules may specify that certain data values with an older time stamp are to overwrite a date value having a newer time stamp, a higher or lower value is to overwrite a lower or higher value, respectively, other values are to be added or subtracted, certain values having a high assigned priority are to overwrite another value having a lower assigned priority, or other data values are to be combined or appended. Typically, the merging function 124 is called by the workflow control module 13 when in the workflow scenario two transitions from different workflow states lead to one common workflow state. Depending on the implementation, the merging function 124 can also be called by application process 11, 31 or by the workflow control module 13.

The state setting function 125 is configured to set a new value for the object state of a data object instance. The new value is determined by the state setting function 125 based on the processing rules associated with the data object and based on the values of the data elements of the object content associated with the data object instance. In an embodiment, based on the value of the new object state, the state setting function 125 also sets (activates/deactivates) actions the user is permitted to perform on the data object. Typically, the state setting function 125 is called by a stored procedure in the database 14 triggered by a change in the values of the aforementioned data elements. However, depending on the implementation, the state setting function 125 can also be called by application process 11 or 31. In an embodiment the state setting function 125 also triggers the snapshot function 122, for example, if the new object state corresponds to one of a set of defined special object states.

Figure 3:
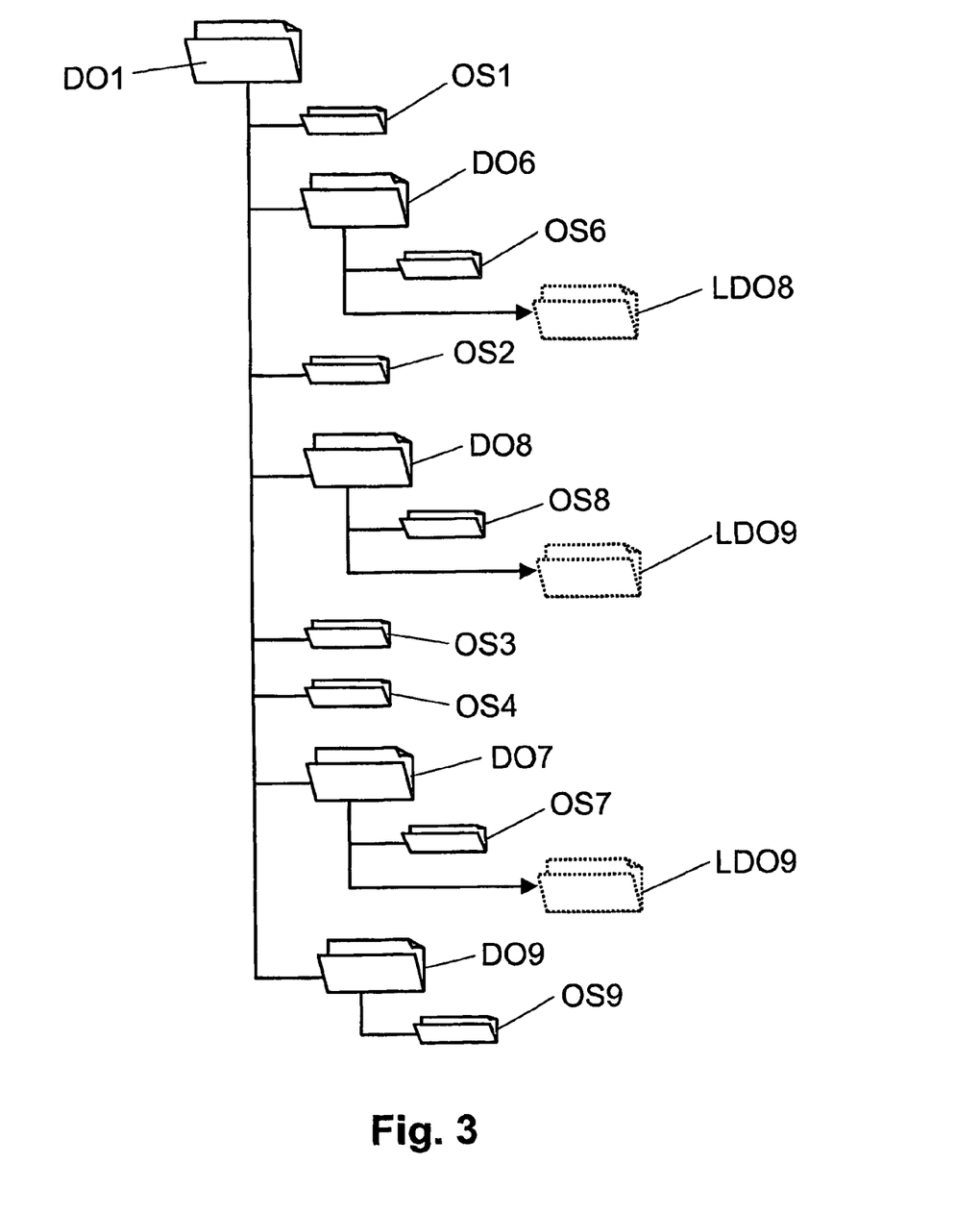
FIG. 3 shows a diagram illustrating multiple instances of a data object as a representation of a hierarchical folder including different states and replicas of the data object.

In the following paragraphs, the movement of a data object through a workflow scenario is described with reference to FIGS. 2 and 3. In FIG. 2, dotted circles indicate workflow states with a new data object instance (new data object at workflow state WS1 or replicas at workflow states WS6, WS7, and WS8). FIG. 3 shows a graphical representation of a hierarchically structured electronic folder, representing the multiple data object instances created in the workflow scenario of FIG. 2.

A new data object instance DO1 is created and associated with an initial workflow state WS1. Through the transition T1, the data object instance DO1 moves from workflow state WS1 to a new workflow state WS2. As is illustrated in FIG. 3, prior to the data object instance DO1 moving to the workflow state WS2, a snapshot OS1 of the data object instance DO1 is created.

From workflow state WS2, the data object instance DO1 moves through transition T2 to the workflow state WS3. A snapshot OS2 of the data object instance DO1 is created prior to the data object instance DO1 moving to the workflow state WS3. In addition, through transition T6, a replica DO6 of the data object instance at workflow state WS2 moves to workflow state WS6. The replica DO6 is created from the data object instance DO1 at workflow state WS2 and is associated with workflow state WS6.

From workflow state WS3, the data object instance DO1 moves through transition T3 to the workflow state WS4. A snapshot OS3 of the data object instance DO1 is created prior to the data object instance DO1 moving to the workflow state WS4. From workflow state WS4, the data object instance DO1 moves through transition T4 to the workflow state WS5. A snapshot OS4 is created of the data object instance DO1 prior to the data object instance DO1 moving to the workflow state WS5.

Through transition T8, a new replica DO8 of the data object instance at workflow state WS3 moves to workflow state WS8. The replica DO8 is created from the data object instance DO1 at workflow state WS3 and is merged with the data object instance DO6 moving through transition T9 from workflow state WS6 to workflow state WS8. The data object instance DO8 is associated with workflow state WS8. A snapshot OS6 of the data object instance DO6 is created prior to the data object instance DO6 moving to the workflow state WS8.

Through transition T7, a replica DO7 of the data object instance DO6 at workflow state WS6 moves to workflow state WS7. The replica DO7 is created from the data object instance DO6 at workflow state WS6 and is associated with workflow state WS7.

From workflow state WS8, the data object instance DO8 moves through transition T10 to the workflow state WS9 and merges with data object instance DO7 moving through transition T11 from workflow state WS7 to workflow state WS9. Snapshots OS7 and OS8 of the data object instances DO7 or DO8, respectively, are created prior to the data object instances DO7 or DO8 moving to the workflow state WS9. Merging the two data object instances DO7 and DO8, each having their own history, forms the merged data object DO9. Depending on the implementation, merging two data object instances, each having its own history, results in the creation of a new (merged) data object instance or in the merging of one of the two data object instances into the other one of the two data object instances, as described above for transitions T8 and T9. For example, in a practical application, two replicas, each representing a data object instance for collecting data elements related to an offer, merge back into one data object instance, representing a contract defined on the basis of the two offers.

From workflow state WS9, the data object instance DO9 moves through transition T12 to the workflow state WS10. A snapshot OS9 of the data object instance DO9 is created prior to the data object instance DO9 moving to the workflow state WS10.

FIG. 3 illustrates a graphical representation of a hierarchical structured electronic folder including the different data object instances created in the workflow scenario of FIG. 2. The initial data object instance DO1 is illustrated as having subfolders for data object instances created as snapshots OS1, OS2, OS3, and OS4; as replicas DO6, DO7, and DO8; and as a merged data object DO9. For example, the subfolders are listed in order of the time when the respective data object instances were created. The subfolders for the data object instances DO6, DO7, DO8, and DO9 have their own subfolders for data object instances created as snapshots OS6, OS8, OS7 and OS9. Furthermore, the subfolders for the data object instances DO6, DO7, DO8, participating in the merging of data object instances, include links LDO8, LDO9 to the subfolders representing the merged data object instance DO8 or DO9, respectively. The folder structure shows clearly that the data object instance DO6 was merged with the data object instance DO8 and that the data object instances DO8 and DO7 were merged into the data object instance DO9. The graphical representation of the electronic folder structure is displayed to the user on the display 4 of workstation 3. Depending on user profile information and workflow rules, the user can access a data object instance for execution of permitted actions, such as viewing or modifying, by activating the corresponding folder icon (e.g. by double clicking).

The mapping function 126 is configured to receive requests for data objects identified by a unique locating reference and to provide to the requester controlled access to the data object. Typically, the mapping function 126 is called by application process 11 or 31. Nevertheless, the mapping function 126 can also be called by the workflow control module 13. In the following paragraphs, an exemplary sequence of steps executed by the mapping function 126 is described with reference to FIG. 4.

Figure 4:
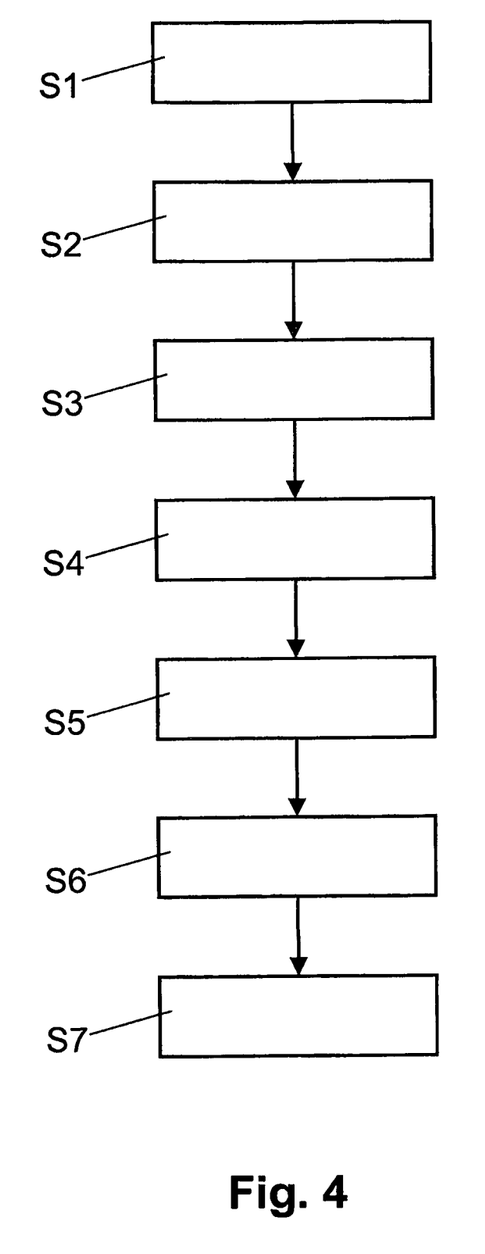
FIG. 4 shows a flow diagram illustrating an example of a sequence of steps executed according to the present invention for processing a request for a data object.

In step S1, the mapping function 126 receives from a user a request for a data object identified by a unique locating reference.

In step S2, the mapping function 126 retrieves from the database 14 the data object instance 143 identified by the unique locating reference received in step S1.

In step S3, the mapping function 126 retrieves from the database 14 the user profile 144 for the user that submitted the request received in step S1.

In step S4, the mapping function 126 determines based on the user profile 144 and based on one or more modifiers, possibly supplied with the request in step S1, data object instances (snapshots, replicas) related to the requested data object. These related data object instances are retrieved from the database 14. Typically, a modifier includes a value of a data element of the data object's data structure, for example, a specific instance or an object attribute such as object state (e.g. "/state=approved"), status attribute (e.g. "/status=validated"), time (e.g. "/time=now"), version (e.g. "/version=last"), action (e.g. "/action=default", i.e. view and modify), or media (e.g. "/media=default", i.e. XML and HTML). The modifier may also specify the "current" data object, which refers to the data object instance considered to be the most significant for the user at the present time (see step S6).

In step S5, the mapping function 126 determines based on the user profile 144, the modifiers, the object states, and the workflow states, associated with the data object instances, actions which the user is permitted to perform on the data object instances and which the user requested to perform on the data object instances. These permitted/requested actions are set on the respective data object instances to be provided to the user. Typically, snapshots may be viewed and/or modified while snapshots may only be viewed.

In step S6, the mapping function 126 determines based on the user profile and based on the requested data object and its related data object instances the data object instance considered to be most significant for the user (i.e. the "current" data object). For example, the most significant data object instance is determined based on the user's role and the object state and/or workflow states associated with the data object instances.

In step S7, the mapping function 126 returns to the user (e.g. at workstation 3) the data object instances determined in step S4 with the permitted actions set as determined in step S5. Preferably, the contents of the data object instance determined to be most significant to the user in step S6 is displayed on the display 4 of workstation 3 and a graphical representation of an electronic folder, as illustrated in FIG. 3, is displayed on the workstation for the user to access other related data object instances, if applicable.

Figure 5:
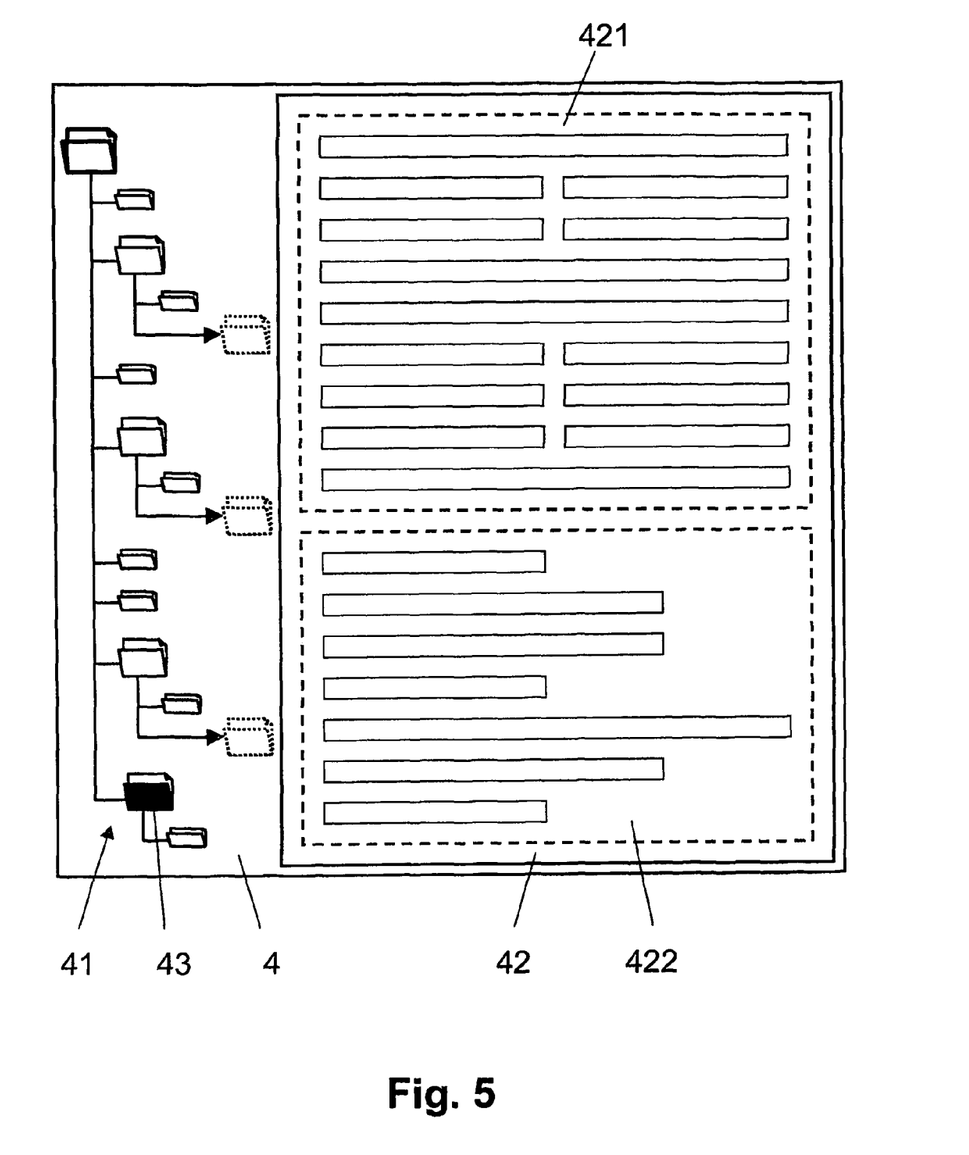
FIG. 5 shows a block diagram illustrating schematically an exemplary configuration of a display showing a graphical representation of an electronic folder of data object instances next to a current data object.

In FIG. 5, the display 4 of the workstation 3 is illustrated in more detail. The display 4 shows a graphical representation of an example of an electronic folder 41 of the data object instances. The graphical representation 43 (e.g. an icon or thumbnail) of the most significant (or "current") data object instance for the user of workstation 3 is indicated by filled-in black. The contents 42 of the selected (or the most significant) data object instance are displayed next to the electronic folder 41. For example, the contents 42 of the current data object instance include data values 421 of data elements as well as labelled data entry fields 422 for further data elements. Provided he is permitted, the user can access related data object instances for view and/or modification by selecting the respective folder elements, e.g. by clicking on the respective icon or thumbnail. Thus the graphical representation of the electronic folder represents a graphical user interface for accessing a data object and its individual snapshots and replicas. One skilled in the art understands that there are other ways of providing a user interface for accessing a data object and its individual snapshots and replicas without deviating from the scope of the invention.

It must be pointed out that different sequences of steps S1 to S7 are possible without deviating from the scope of the invention.

Using a single "handle", i.e. the unique locating reference, the system 1 makes it possible for a user to view the "current" data object instance, whatever "current" is defined to be. Using the same "handle", the system 1 makes it possible for the user to access easily and consistently snapshots and/or replicas of the data object. Moreover, the system 1 assigns dynamically actions to be performed on a data object instance by a user at a certain processing stage (workflow state), based on object state, workflow state, and user profile. Using the same reference, a user with a first role may be provided with a different presentation of a data object than another user with a different second role. Likewise, using the same reference, a user may be provided with a different presentation of a data object when the data object is associated with a first workflow state than when it is associated with a different second workflow state. For example, a data object can be used as a representation of a business object such as a contract, an offer, a tender, or an insurance claim. Throughout the whole life cycle of a data object the (original) unique locating reference always points to the latest version. If the original data object spawned new data object instances, these new data object instances are accessible to a user also, always giving precedence to the data object instance considered by the system 1 to be most significant ("current") for the user.

The proposed data structures and functional modules make it possible, for a systems programmer, to enable computer-based systems and methods to process data objects at different processing stages, while data objects can be processed concurrently by multiple users, while data objects can be split at defined processing stages into separate replicas, while separate replicas can be rejoined at defined processing stages, and while data objects, related replicas, and historical snapshots of the data objects, taken at defined states and/or processing stages, can be referenced by means of one unique locating reference.

The invention claimed is:

1. A computer-based system for processing data objects, the system comprising:
a processor and a memory that stores instructions, the instructions executed by the processor to
create a data object by preparing a data structure for the data object in a database;
process the data object at different processing stages, assigning a different workflow state with the data object at each processing stage;
create a unique locating reference for the data object;
take and store a snapshot of at least a part of the data object, prior to each workflow transition of the data object from a first workflow state to a second workflow state immediately following the first workflow state, the taking and storing a snapshot including assigning the first workflow state with the snapshot and assigning the second workflow state with the data object;
create a replica of the data object when two predetermined parallel workflow states immediately follow the first workflow state to form a forked workflow structure, the creating a replica including:
  creating a new data object including a copy of the data object and a unique locating reference for the replica,
  assigning a first one of the two parallel workflow states with the replica,
  assigning a second one of the two parallel workflow states with the data object, and
  creating the unique locating reference for the replica, the unique locating reference for the replica based on the unique locating reference of the data object;
receive from an application process the unique locating reference for the data object; and
provide to the application process controlled access to the data object, to the snapshot and to the replica based on the unique locating reference for the data object, wherein
receiving the unique locating reference for the data object and providing controlled access to the data object and to the snapshot include providing to a user of the application process access to the data object, to one or more replicas created of the data object, and to one or more snapshots taken of the data object and the replicas, in response to receiving the unique locating reference for the data object and based on a user profile associated with the user and on object states and workflow states assigned to the data object, the snapshots, and the replicas, and
the processor is further configured to restrict actions performed on the data object, the replicas, and the snapshots, based on the user profile, the object states, and the workflow states.

2. The system according to claim 1, wherein the processor is further configured to execute the instructions to
  determine an object state of the data object based on individual values of data elements of the data object's data structure; and
  restrict actions performed on the data object depending on the object state and depending on a user profile associated with a user of the application process.

3. The system according to claim 1, wherein the processor is further configured to execute the instructions to
  determine from the data object, the snapshots, and the replicas a most significant data object; and
  present to the user on a display a view of the most significant data object and make available to the user data objects not determined to be the most significant data object.

4. The system according to claim 1, wherein
  the receiving the unique locating reference for the data object and providing access to the data object and to the snapshot include receiving a modifier with the unique locating reference for the data object and providing to a user of the application process access to the data object, to one or more replicas created of the data object, and to one or more snapshots taken of the data object and the replicas, in response to receiving the unique locating reference for the data object, the access being provided to the user based on the modifier, and
  the processor is further configured to execute the instructions to restrict actions performed on the data object, the replicas, and the snapshots, the actions being restricted based on the modifier.

5. The system according to claim 4, wherein the modifier includes a value of a data element of the data object's data structure.

6. The system according to claim 1, wherein the processor is further configured to execute the instructions to restrict the workflow transition of the data object based on workflow rules and values of data elements of the data object's data structure.

7. The system according to claim 1, wherein the processor is further configured to execute the instructions to
  determine an object state of the data object based on individual values of data elements of the data object's data structure; and
  create and store a snapshot of at least a part of the data object when the object state corresponds to one of a set of defined special object states, the creating and storing a snapshot including assigning the object state with the snapshot.

8. The system according to claim 1, wherein the processor is further configured to execute the instructions to
  present to a user of the application process on a display a different view of the data object depending on the workflow state assigned to the data object and depending on a user profile associated with the user.

9. A computer-implemented method of processing data objects, comprising:
  creating a data object by preparing a data structure for the data object in a database;
  processing the data object at different processing stages, assigning a different workflow state with the data object at each processing stage;
  creating a unique locating reference for the data object;
  taking and storing a snapshot of at least a part of the data object, prior to each workflow transition of the data object from a first workflow state to a second workflow state immediately following the first workflow state;
  assigning the first workflow state with the snapshot;
  assigning the second workflow state with the data object;
  creating a replica of the data object when two predetermined parallel workflow states immediately follow the first workflow state to form a forked workflow structure, the creating the replica including creating a new data object including a copy of the data object and a unique locating reference for the replica;
  assigning a first one of the two parallel workflow states with the replica;
  assigning a second one of the two parallel workflow states with the data object;
  creating the unique locating reference for the replica based on the unique locating reference for the data object;
  receiving from an application process the unique locating reference for the data object; and
  providing to the application process controlled access to the data object, to the snapshot and to the replica based on the unique locating reference for the data object, wherein
  receiving the unique locating reference for the data object and providing controlled access to the data object and to the snapshot includes providing to a user of the application process access to the data object, to one or more replicas created of the data object, and to one or more snapshots taken of the data object and the replicas, in response to receiving the unique locating reference for the data object and based on a user profile associated with the user and on object states and workflow states assigned to the data object, the snapshots, and the replicas, and the method further comprises restricting actions performed on the data object, the replicas, and the snapshots, based on the user profile, the object states, and the workflow states.

10. The data processing method according to claim 9, further comprising:
    determining from the data object, the snapshots, and the replicas a most significant data object;
    presenting to the user on a display a view of the most significant data object; and
    making available to the user means for accessing data objects not determined to be the most significant data object.

11. The data processing method according to claim 9,
    wherein the receiving the unique locating reference for the data object and providing access to the data object and to the snapshot includes receiving a modifier with the unique locating reference for the data object and providing to a user of the application process access to the data object, to one or more replicas created of the data object, and to one or more snapshots taken of the data object and the replicas, in response to receiving the unique locating reference for the data object, the access being provided based on the modifier; and
    wherein the method further comprises restricting actions performed on the data object, the replicas, and the snapshots, the actions being restricted based on the modifier.

12. The data processing method according to claim 11, wherein the modifier includes a value of a data element of the data object's data structure.

13. The data processing method according to claim 9, further comprising:
    determining an object state of the data object based on individual values of data elements of the data object's data structure;
    creating and storing a snapshot of at least a part of the data object when the object state corresponds to one of a set of defined special object states; and
    assigning the object state with the snapshot.

14. The data processing method according to claim 9, further comprising:
    determining an object state of the data object based on individual values of data elements of the data object's data structure; and
    restricting actions performed on the data object depending on the object state and depending on a user profile associated with a user of the application process.

15. The data processing method according to claim 9, further comprising presenting to a user of the application process on a display a different view of the data object depending on the workflow state assigned to the data object and depending on a user profile associated with the user.

16. The data processing method according to claim 9, further comprising restricting the workflow transition of the data object based on workflow rules and values of data elements of the data object's data structure.

17. A non-transitory computer readable medium storing computer readable instructions thereon which, when executed by a computer, cause the computer to perform a method comprising:
    creating a data object by preparing a data structure for the data object in a database;
    processing the data object at different processing stages, assigning a different workflow state with the data object at each processing stage;
    creating a unique locating reference for the data object;
    taking and storing a snapshot of at least a part of the data object, prior to each workflow transition of the data object from a first workflow state to a second workflow state immediately following the first workflow state;
    assigning the first workflow state with the snapshot;
    assigning the second workflow state with the data object;
    creating a replica of the data object when two predetermined parallel workflow states immediately follow the first workflow state to form a forked workflow structure, the creating the replica including creating a new data object including a copy of the data object and a unique locating reference for the replica;
    assigning a first one of the two parallel workflow states with the replica;
    assigning a second one of the two parallel workflow states with the data object;
    creating the unique locating reference for the replica based on the unique locating reference for the data object;
    receiving from an application process the unique locating reference for the data object; and
    providing to the application process controlled access to the data object, to the snapshot and to the replica based on the unique locating reference for the data object, wherein
    receiving the unique locating reference for the data object and providing controlled access to the data object and to the snapshot includes providing to a user of the application process access to the data object, to one or more replicas created of the data object, and to one or more snapshots taken of the data object and the replicas, in response to receiving the unique locating reference for the data object and based on a user profile associated with the user and on object states and workflow states assigned to the data object, the snapshots, and the replicas, and
    the method further comprises restricting actions performed on the data object, the replicas, and the snapshots, based on the user profile, the object states, and the workflow states.

* * * * *